United States Patent [19]

Toshio et al.

[11] Patent Number: 4,852,853
[45] Date of Patent: Aug. 1, 1989

[54] PRESSURE BALANCE TYPE SOLENOID CONTROLLED VALVE

[75] Inventors: Kamimura Toshio; Ito Koji, both of Gifu, Japan

[73] Assignee: Teijin Seiki Co., Ltd., Osaka, Japan

[21] Appl. No.: 193,407

[22] Filed: May 12, 1988

[30] Foreign Application Priority Data

May 14, 1987 [JP] Japan .............................. 62-72306[U]

[51] Int. Cl.[4] .............................................. F16K 31/06
[52] U.S. Cl. .................................. 251/129.07; 251/86
[58] Field of Search ....................... 251/129.07, 129.08, 251/282, 86

[56] References Cited

U.S. PATENT DOCUMENTS 3,788,597 1/1974 Ichioka ............................ 251/129.08
3,945,399 3/1976 Tirelli ......................... 251/129.08 X Primary Examiner—Arnold Rosenthal
Attorney, Agent, or Firm—Burgess, Ryan & Wayne

[57] ABSTRACT

A pressure balance type solenoid controlled valve suitable for use under contaminated environments. The valve comprises a body, a solenoid mounted in the body, an armature mounted in the body movably by the solenoid and a poppet valve connected to the armature. The body has a sleeve loosely fitted thereto and a fluid passage formed therein. The poppet valve is provided with a seat portion for switching the fluid passage formed at a front end thereof. The poppet valve is pivotally connected to the armature at a rear end thereof. The poppet valve has an outer diameter substantially equal to a diameter of the seat portion at an intermediate portion between the front end and the rear end. The intermediate portion is slidably inserted into the sleeve. The poppet valve has a passage formed therein for equalizing pressures applied to sides of the sleeve.

2 Claims, 1 Drawing Sheet

PRESSURE BALANCE TYPE SOLENOID CONTROLLED VALVE

DETAILED DESCRIPTION OF THE INVENTION

1. Technical Field to which the Invention Relates

This invention relates to a pressure balanced type solenoid controlled valve which reliably operates in contaminated environments.

2. Prior Art

In a conventional pressure balance type solenoid controlled valve, used is a slide valve comprising a combination of a sleeve and a spool with a small clearance therebetween and having a passage formed in the spool so as to balance pressures applied to the sides of the sleeve.

PROBLEMS TO BE SOLVED BY THE INVENTION

In some environments wherein fluid equipment is used, fluid may be contaminated excessively. In such contaminated environments, contamination in the fluid may the clearance between the spool and the sleeve when the fluid passes. As a result, there often occurs times that the valve seizes.

OBJECT OF THE INVENTION

An object of the present invention is to provide a pressure balanced type solenoid controlled valve which does not seize easily.

SUMMARY OF THE INVENTION

According to the present invention, the above-described object is achieved by a pressure balanced type solenoid controlled valve comprising a body, a solenoid mounted in the body, an armature mounted in the body movably by the solenoid and a poppet valve connected to the armature, characterized in that the body has a sleeve loosely fitted thereto and a fluid passage formed therein;

the poppet valve is provided with a seat portion formed at a front end thereof for switching the fluid passage:

the poppet valve is pivotally connected to the armature at a rear end thereof;

the poppet valve has an outer diameter substantially equal to a diameter of the seat portion at an intermediate portion between the front end and the rear end:

the intermediate portion is slidably inserted into the sleeve; and the poppet valve has a passage formed therein for equalizing pressures applied to sides of the sleeve.

BRIEF DESCRIPTION OF THE DRAWINGS

The present invention will now be explained in detail with reference to the attached drawings, wherein.

PREFERRED EMBODIMENT

Figure 2:
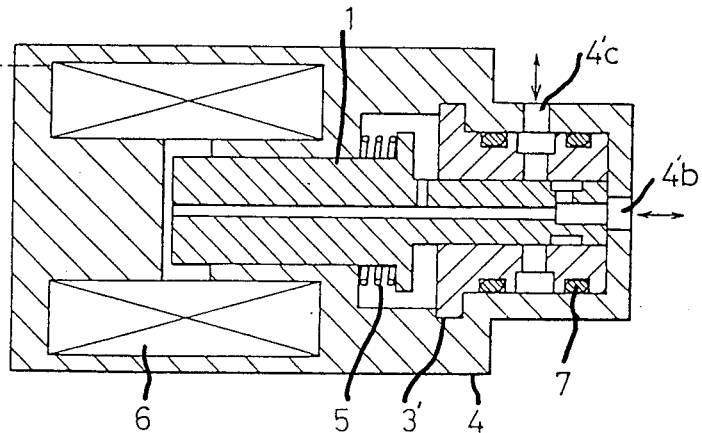
FIG. 2 is a cross sectional view of a conventional pressure balanced type solenoid controlled valve.

A conventional pressure balance type solenoid controlled valve is briefly explained first with reference to FIG. 2, which shows a generally used conventional balanced type solenoid controlled valve. The conventional valve is of a slide valve type. More specifically, the valve comprises a sleeve 3' and a spool 1 which is slidably inserted into the sleeve 3' forming a small clearance therebetween.

A longitudinal passage is formed in the spool 1 so as to balance pressures applied to the ends of the sleeve.

As described above, in excessively contaminated environments, contaminations in fluid may be clogged in the small clearance between the spool 1 and the sleeve 3'. As a result, there often occur inconveniences that the valve seizes.

The present invention was achieved to obviate the above-described inconveniences. The present invention will now be explained in detail with reference to an illustrated embodiment.

Figure 1:
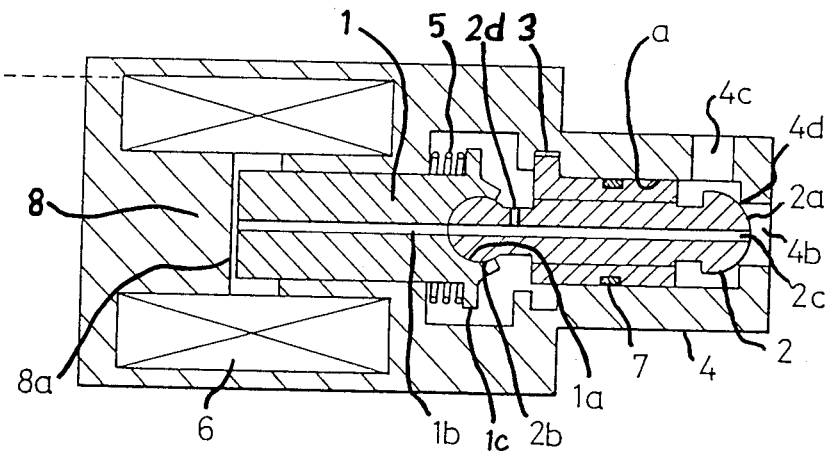
FIG. 1 is a cross sectional view of a pressure balance type solenoid controlled valve of the present invention.

FIG. 1 illustrates the embodiment of a pressure balanced type solenoid controlled valve according to the present invention.

A hollow body 8 of the a pressure balance type solenoid controlled valve has an electromagnetic coil, i.e., solenoid, 6 mounted therein. The electromagnetic coil 6 is electrically connected to a power source.

The hollow body 8 has an armature 1 slidably inserted within a recess formed therein. The armature 1 is magnetically attracted toward an electromagnetic attractive surface 8a of the body 8 by means of the electromagnetic coil 6.

The armature 1 has a shoulder 1c formed around the front end thereof, i.e., the right end in FIG. 1. A compression spring 5 is mounted between the shoulder 1c and the body 8 so that the armature 1 is urged to right.

The armature 1 has a spherical recess 1a formed at the head portion, i.e., the right side in FIG. 1, thereof in such a shape that it engages with a spherical body.

A poppet valve 2 has a spherical portion 2b formed at the rear end, i.e., the joint portion, thereof. The spherical portion 2b of the poppet valve 2 pivotally engages with the spherical recess 1a of the armature 1.

The right front end 2a of the poppet valve 2 is also shaped in a spherical shape which serves as a seat portion.

A cover 4 is formed in a cup shape and is integrally fixed to the right side of the body 8. The cover 4 has ports 4b and 4c for supplying and discharging fluid formed at the right side thereof.

The seat portion of the poppet valve 2 sits on the peripheral edge 4d of the port 4b.

A cylindrical sleeve 3 is inserted into the cylinder portion of the cover 4 via an O-ring 7, which cylinder portion is formed at the right side of the body 8. More specifically, a clearance a is formed between the sleeve 3 and the cover 4, which clearance is larger than a clearance which will be formed under a usual sliding condition. Thus, the sleeve 3 is loosely fitted to the cover 4 and is capable of swivel in a radial direction.

The intermediate portion of the poppet valve 2 is slidably and sealingly inserted into the hollow portion of the sleeve 3. The diameter of the intermediate portion of the poppet valve 2, which portion engages with the sleeve 3, is substantially the same as that of the seat portion of the poppet valve 2.

The poppet valve 2 has a longitudinal hole 2c and a radial hole 2d formed therein. The longitudinal hole 2c extends from the head portion 2a, which has the seat portion shaped in the form of a spherical shape, to the rear portion of the sleeve 3. The radial hole 2d extends radially from the longitudinal hole 2c so that the fluid pressure at the port 4b is applied to a position located at the left of the sleeve 3.

The above-described hole 2c further extends to a position near the electromagnetic attractive surface 8a through a hole 1b formed in the armature 1.

The operation of the pressure balanced type solenoid controlled valve of the present invention will now be explained.

When the electromagnetic coil 6 is not energized, fluid pressure is supplied from the port 4b to the left side of the sleeve 3 through the holes 2c and 2d. Accordingly, substantially the same pressures are applied to the sides of the poppet valve 2, and the poppet valve 2 is under a pressure balanced condition. Thus, the poppet valve 2 is urged to right by means of the compression spring 5, which urges the armature 1 at the joint portion, and the seat portion of the poppet valve 2 sits on the seat 4d of the port 4b.

When the electromagnetic coil 6 is energized, the armature 1 is attracted toward the attractive surface 8a. Thus, the poppet valve 2 opens. As a result, fluid flows from the port 4b to the port 4c.

The poppet valve 2 is pivotally connected to the armature 1 at the joint portion, and the sleeve 3 is loosely fitted to the body of the pressure balance type solenoid controlled valve forming a small radial clearance, as described above. Accordingly, the poppet valve 2 can swivel. Further, the spherical portion formed at the front end of the poppet valve 2 is in contact with the seat of the pressure balance type solenoid controlled valve, i.e., the cover 4 in the illustrated embodiment, only in a line. Accordingly, if small contaminations floating in fluid are clogged between the poppet valve 2 and the cover 4 at the seat portion 4d, the contaminations are readily removed by the above-described swivel motion of the poppet valve 2, and the clogging condition disappears.

ADVANTAGES OF THE INVENTION

According to the present invention, a pressure balanced type solenoid controlled valve is provided, which valve does not seize easily when it is used under contaminated environments.

What is claimed is:

1. A pressure balance type solenoid controlled valve comprising an armature and a poppet valve pivotally connected to each other at a joint portion, wherein said poppet valve is provided with a seat portion formed at a front end thereof for switching a fluid passage, said poppet valve has an outer diameter substantially equal to a diameter of said seat portion at an intermediate portion between said seat portion and said joint portion, said intermediate portion is slidably inserted into a sleeve loosely fitted to a body of the solenoid controlled valve, and said poppet valve has a passage formed therein for equalizing pressures applied to sides of said sleeve.

2. A pressure balance type solenoid controlled valve comprising a body, a solenoid mounted in said body, an armature mounted in said body movably by said solenoid and a poppet valve connected to said armature, characterized in that said body has a sleeve loosely fitted thereto and a fluid passage formed therein;

said poppet valve is provided with a seat portion formed at a front end thereof for switching said fluid passage;

said poppet valve is pivotally connected to said armature at a rear end thereof;

said poppet valve has an outer diameter substantially equal to a diameter of said seat portion at an intermediate portion between said front end and said rear end;

said intermediate portion is slidably inserted into said sleeve; and said poppet valve has a passage formed therein for equalizing pressures applied to sides of said sleeve.

* * * * *

UNITED STATES PATENT AND TRADEMARK OFFICE
CERTIFICATE OF CORRECTION

PATENT NO. : 4,852,853

DATED : August 1, 1989

INVENTOR(S) : Toshio Kamimura, et al

It is certified that error appears in the above-identified patent and that said Letters Patent is hereby corrected as shown below:

On the title page:

Item [75] Inventors: please set out the names of the inventors as follows: --Toshio Kamimura; Koji Ito, both of Gifu, Japan--.

Signed and Sealed this

Fourteenth Day of August, 1990

Attest:

HARRY F. MANBECK, JR.

*Attesting Officer*      *Commissioner of Patents and Trademarks*